(12) United States Patent
Kim et al.

(10) Patent No.: US 8,261,405 B2
(45) Date of Patent: Sep. 11, 2012

(54) WIPER BLADE ASSEMBLY HAVING ROTATABLE AUXILIARY BEAM

(75) Inventors: Kwan Hee Kim, Daegu (KR); Kyungyol Kim, Daegu (KR); Jaehyuck An, Daegu (KR)

(73) Assignee: KCW Corporation, Daegu (KR)

( * ) Notice: Subject to any disclaimer, the term of this patent is extended or adjusted under 35 U.S.C. 154(b) by 452 days.

(21) Appl. No.: 12/471,537

(22) Filed: May 26, 2009

(65) Prior Publication Data

US 2010/0281645 A1 Nov. 11, 2010

(30) Foreign Application Priority Data

May 7, 2009 (KR) .................. 10-2009-0039614

(51) Int. Cl.
*B60S 1/38* (2006.01)
(52) U.S. Cl. .................. 15/250.46; 15/250.44
(58) Field of Classification Search ............. 15/250.44, 15/250.46, 250.361, 250.47
See application file for complete search history.

(56) References Cited

U.S. PATENT DOCUMENTS

| | | | | |
|---|---|---|---|---|
| 3,176,337 A | * | 4/1965 | Glynn | 15/250.453 |
| 3,585,672 A | * | 6/1971 | Habert | 15/250.46 |
| 3,969,784 A | * | 7/1976 | Journee | 15/250.46 |
| 5,245,742 A | * | 9/1993 | Scorsiroli | 29/451 |
| 5,465,454 A | | 11/1995 | Chang | |
| 5,647,088 A | * | 7/1997 | Bommer et al. | 15/250.201 |
| 5,819,361 A | * | 10/1998 | Merkel et al. | 15/250.46 |
| 6,301,742 B1 | * | 10/2001 | Kota | 15/250.46 |
| 6,785,931 B2 | * | 9/2004 | Lee et al. | 15/250.46 |
| 7,028,368 B2 | | 4/2006 | Lee et al. | |

FOREIGN PATENT DOCUMENTS

| | | |
|---|---|---|
| DE | 10029144 A1 | 12/2001 |
| DE | 69522105 T2 | 4/2002 |
| DE | 102008010540 A1 | 6/2009 |
| EP | 0240357 * | 10/1987 |
| EP | 2230139 A1 | 9/2010 |
| FR | 2 739 339 A1 | 4/1997 |
| JP | 1992-23555 | 2/1992 |
| KR | 0373392 | 2/2003 |
| KR | 10-2007-0062061 A1 | 6/2007 |

* cited by examiner

*Primary Examiner* — Gary Graham
(74) *Attorney, Agent, or Firm* — Edwards Wildman Palmer LLP

(57) ABSTRACT

A wiper blade assembly for wiping a windshield of a vehicle actuated by a wiper arm includes a flexible elongated wiper blade adapted to elastically contact with the windshield of the vehicle, a guide beam adapted to transfer the load and motion applied from the wiper arm to the wiper blade, the guide beam having an initial curvature, a plurality of connection members provided along a longitudinal direction of the guide beam, and a plurality of auxiliary beams rotatably coupled to the connection members, serving to hold the wiper blade.

4 Claims, 8 Drawing Sheets

WIPER BLADE ASSEMBLY HAVING ROTATABLE AUXILIARY BEAM

CROSS-REFERENCE TO RELATED APPLICATION

This application claims the benefit of priority under 35 U.S.C. §119(a) to Korean Patent Application No. 10-2009-0039614, filed May 7, 2009, the entire contents of which are incorporated herein by reference.

BACKGROUND OF THE INVENTION

1. Technical Field

The present invention relates to a wiper blade assembly for wiping a windshield of a vehicle actuated by a wiper arm, and more particularly, to a wiper blade assembly that has a plurality of auxiliary beams each having a given initial curvature and providing a given elastic force, thereby uniformly applying the load applied from the wiper arm to the end portions of a wiper blade. The plurality of auxiliary beams are rotatably mounted on a guide beam, thereby substantially enhancing compliance with variations in the curvature of the windshield surface and treatment thereof, and further improving the degree of freedom according to the curvatures of the windshield surface.

2. Background of the Related Art

A wiper is adapted to come into close contact with a curved windshield of a vehicle so as to remove foreign materials that have accumulated on the surface of the windshield. There are two methods for facilitating contact between the wiper and the curved windshield surfaces. The first method is carried out by distributing the forces applied by a wiper arm to the wiper blade, and the second method is carried out by providing an initial curvature to the wiper blade assembly.

Generally, the wiper using the second method is called a flat wiper. The present invention relates particularly to flat wiper blade assemblies. If the wiper blade assembly has a given elastic force by the formation of an initial curvature thereof, it can be brought into close contact with the windshield of the vehicle, without having an additional structure for distributing the load applied from the wiper arm thereto. Advantageously, the configuration of such a blade is simplified.

Many conventional wiper blade assemblies include a flexible elongated wiper blade having a given elastic force that elastically contacts a vehicle windshield, a guide beam coupled to the flexible elongated wiper blade, having a given initial curvature to transfer the load applied from a wiper arm to the wiper blade, thereby allowing the wiper blade to come into direct contact with the vehicle windshield, and rail springs adapted to maintain the wiper blade in a predetermined shape.

Such conventional wiper blade assemblies are configured with the wiper blade and the guide beam extending longitudinally and the wiper blade is brought into close contact with the vehicle windshield by means of the elastic force provided by the formation of the initial curvature of the guide beam and the load applied from the wiper arm.

In these conventional wiper blade assemblies, the guide beam extends in a longitudinal direction with respect to the wiper blade, but the wiper arm is connected to the central portion of the guide beam. However, the load applied from the wiper arm is not distributed uniformly to the guide beam and is applied to only the central portion thereof, resulting in application of a relatively small load from the wiper arm to the end portions of the guide beam.

Therefore, the end portions of the guide beam do not effectively perform their intended function of allowing the wiper blade to come into close contact with the windshield of the vehicle. Thus, if the vehicle windshield has a relatively large curvature, the end portions of the wiper blade remain spaced from the surface of the windshield.

On the other hand, if the guide beam has a relatively large curvature, so as to allow the end portions of the wiper blade to come into close contact with the windshield, the stiffness of the guide beam may prove to be undesirably low, such that the region between the central portion and the end portion of the guide beam is spaced apart from the surface of the vehicle windshield. To the contrary, if the chosen stiffness of the guide beam is high, the wiper blade is not brought into uniform contact with the surface of the windshield.

SUMMARY OF THE DISCLOSURE

Accordingly, the present invention has been made in view of the above-mentioned problems of the prior art, and it is an object of the present invention to provide a wiper blade assembly that allows a wiper blade to completely closely contact a vehicle windshield that has a variety of curvatures.

To accomplish the above object, according to a first aspect of the present invention, there is provided a wiper blade assembly for wiping a windshield of a vehicle actuated by a wiper arm, the wiper blade assembly including: a flexible elongated wiper blade adapted to come into elastic contact with the windshield of the vehicle; a guide beam adapted to apply the load and motion applied from the wiper arm to the wiper blade and being bent to have a given initial curvature; a plurality of connection members provided along a longitudinal direction of the guide beam; and a plurality of auxiliary beams rotatably coupled to the connection members and serving to hold the wiper blade.

According to the present invention, preferably, each auxiliary beam has one or more frames, each having a round first coupling hole formed in the center portion thereof, and each connection member having a body with a round second coupling hole formed at the positions corresponding to the first coupling holes of the auxiliary beam, such that as the first coupling holes and the second coupling holes are fixedly connected by way of the insertion of a coupling member therein, thus rotatably coupling the auxiliary beam and the connection member.

According to the present invention, preferably, each connection member has coupling parts formed on opposite ends of the body thereof for engaging the guide beam, and the guide beam has first coupling apertures formed spaced apart from one another in such a manner as to fixedly accept the coupling parts of each connection member therein.

According to the present invention, preferably, each coupling part of the connection member has two elastic plates located in parallel to one another, and the two elastic plates have a locking projection extended outwardly in opposite directions from one another.

According to the present invention, preferably, each auxiliary beam has holding parts formed at opposite end portions thereof, and the holding parts may be adapted to fixedly hold the wiper blade.

According to the present invention, preferably, each auxiliary beam is made of a material having a given initial curvature, which is elastically deformable.

According to the present invention, preferably, the guide beam is formed of a flat spring, which is elastically deformable.

To accomplish the above object, according to a second aspect of the present invention, there is provided a wiper blade assembly for wiping a windshield of a vehicle actuated by a wiper arm. The wiper blade assembly includes a flexible elongated wiper blade adapted to elastically contact the windshield of the vehicle, a guide beam adapted to apply the load and motion applied from the wiper arm to the wiper blade, and bent to have a given initial curvature. The guide beam has a plurality of apertures formed therein, spaced apart from one another in a longitudinal direction thereof. A plurality of connection members are arranged over the guide beam along the longitudinal direction thereof, in such a manner as to be inserted into the apertures of the guide beam. A plurality of auxiliary beams are located under the guide beam in such a manner as to be rotatably coupled to the connection members, each of the plurality of auxiliary beams serving to hold the wiper blade.

According to the present invention, preferably, each auxiliary beam has one or more frames formed in the center portion thereof in such a manner as to be connected to one another by way of a cylindrical member, each connection member having a body with a coupling groove formed at a position corresponding to the cylindrical member of the auxiliary beam, such that as the cylindrical member connected between the frames of the auxiliary beam is inserted into the coupling groove of the connection member, the auxiliary beam is rotatably coupled to the connection member.

According to the present invention, preferably, each connection member further comprises stopping parts formed on the sides of the ends thereof in such a manner as to come into contact with the guide beam, thereby limiting rotational movement of the connection member.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Hereinafter, an explanation on a wiper blade assembly according to preferred embodiments of the present invention will be given with reference to the attached drawings.

Figure 1:
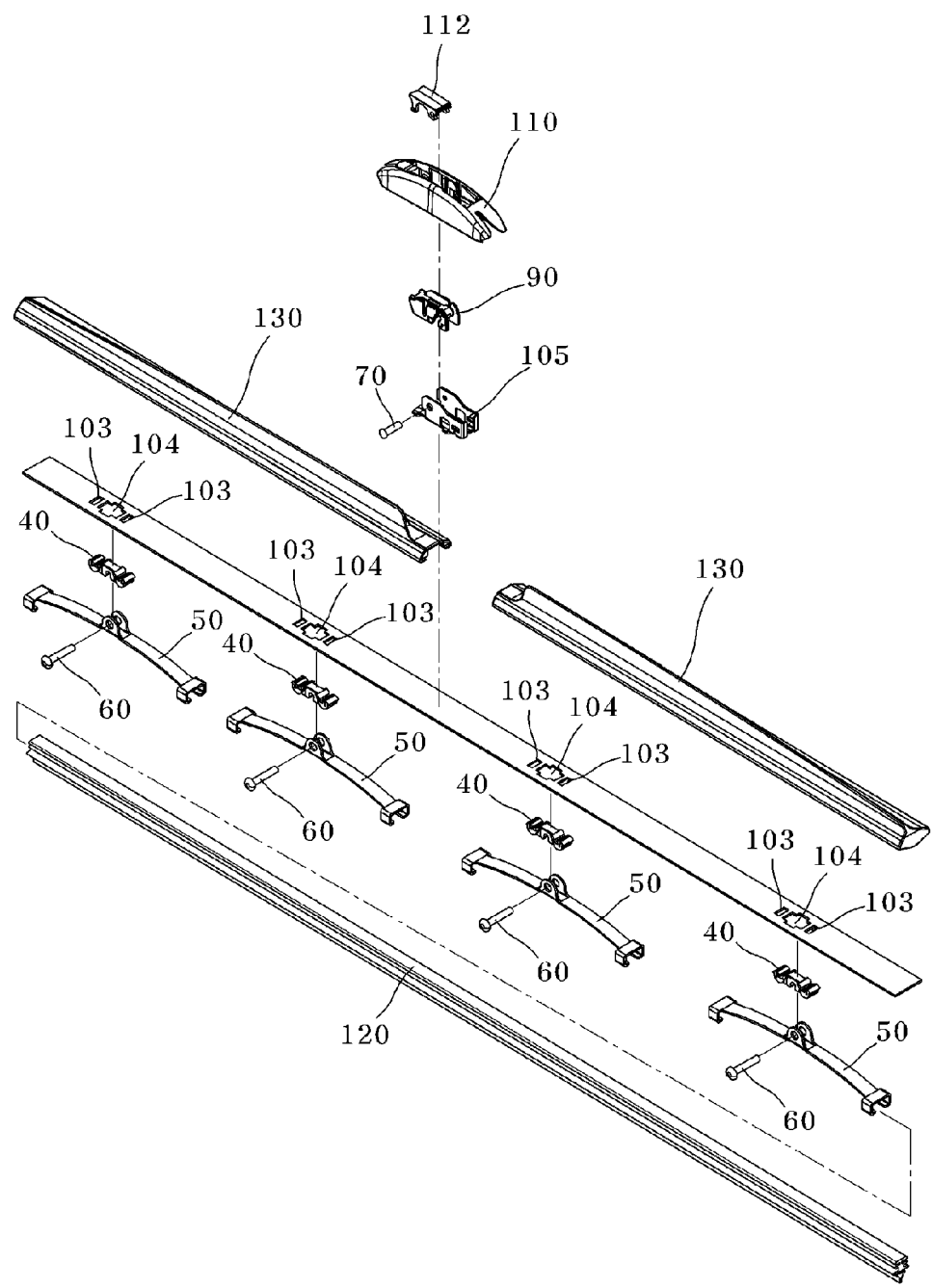
FIG. 1 is an exploded perspective view showing a wiper blade assembly according to a first embodiment of the present invention.
Figure 2:
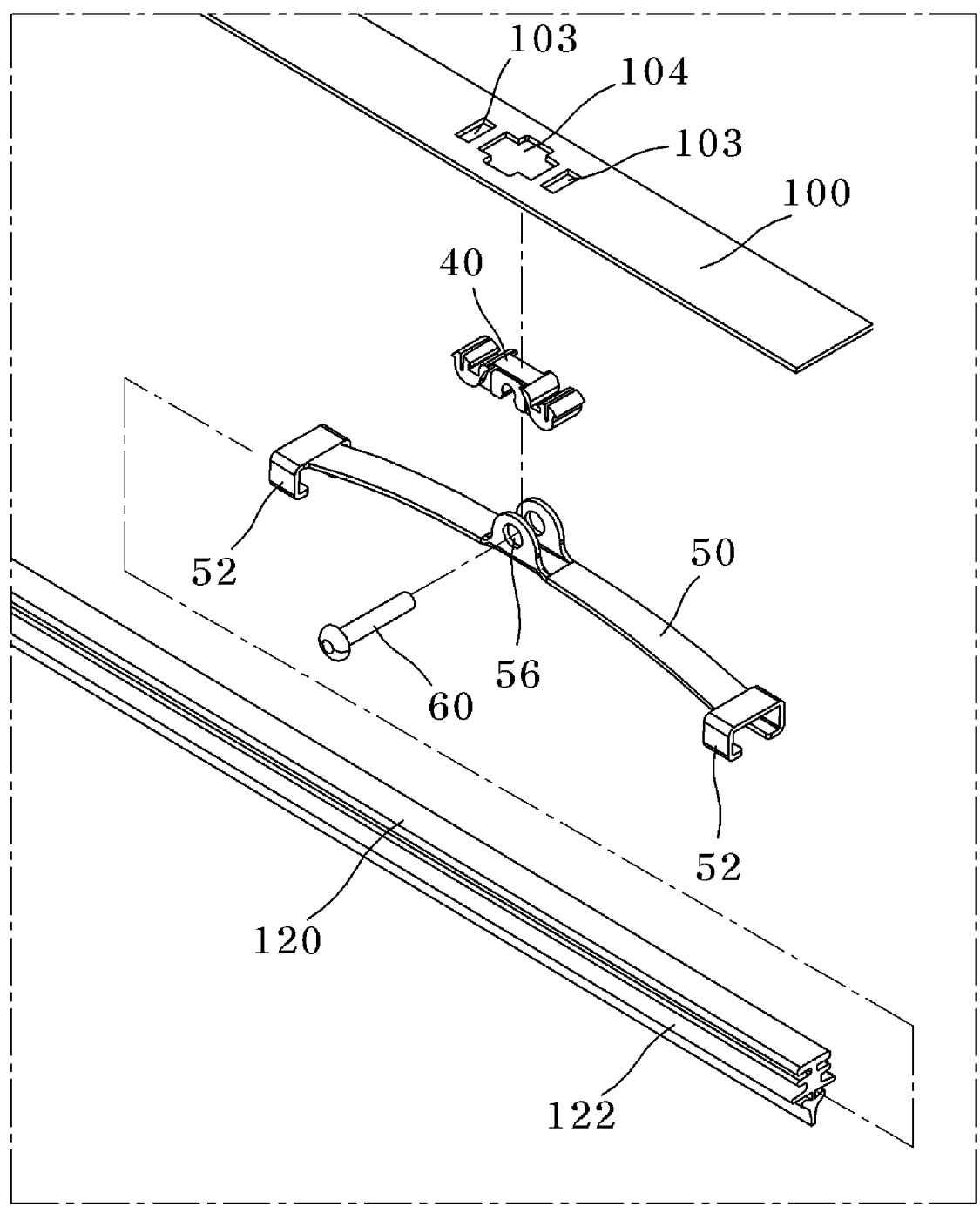
FIG. 2 is a partial perspective view showing the wiper blade assembly according to the first embodiment of the present invention.

FIG. 1 is an exploded perspective view showing a wiper blade assembly according to a first embodiment of the present invention, and FIG. 2 is a partial perspective view showing the wiper blade assembly according to the first embodiment of the present invention.

The present invention relates to a wiper blade assembly for wiping a windshield of a vehicle actuated by a wiper arm, and as shown in FIG. 1, the wiper blade assembly basically includes a wiper blade 120, a guide beam 100, a plurality of connection members 40, a plurality of auxiliary beams 50, a connector 105 holding the guide beam 100, a guide clip 90 coupled to the wiper arm in such a manner as to be fastened to the connector 105 through a coupling element 70, a guide cap 110 covering the guide clip 90, spoilers 130 providing good appearance to the guide beam 100 and improving air flowability, and a cover 112 partially covering the guide cap 110.

Among them, the connector 105, the guide clip 90, the guide cap 110, the cover 112 and the spoilers 130 are well known in the art, and therefore, they are not described in detail herein.

The wiper blade 120 is adapted to come into elastic contact with a surface of the vehicle windshield so as to remove any foreign materials accumulated on the vehicle windshield. Further, the wiper blade 120 is flexible and longitudinally elongated. Generally, the wiper blade 120 is made of a rubber material.

The wiper blade 120 includes a body portion and a blade portion, as shown in the drawing. The blade portion has a sectional area, the width thereof gradually decreasing toward the lower end portion of the blade. The body portion is formed integrally with the blade portion and is generally shaped as a rectangular parallelepiped. The wiper blade 120 is also well known in the art, and therefore will not be described in detail herein.

As shown in FIG. 2, the wiper blade 120 has receiving grooves 122 formed longitudinally along the both edges thereof. Holding parts 52 of each auxiliary beam 50, as will be discussed later, are inserted into the receiving grooves 122, thereby mutually coupling the wiper blade 120 and the auxiliary beam 50.

Generally, in typical flat wiper blades, rail springs are inserted into the wiper blade 120, thereby imparting shape to the wiper blade 120. Such rail springs are generally made of a metal material having a given elasticity, and are shaped as an elongated bar. The rail springs are generally coupled to the wiper blade 120 along the side surfaces of the wiper blade 120. Because the wiper blade 120 is flexible and longitudinally elongated, it is typically difficult for the blade to hold desired shape. Thus, the formation of the rail springs 20 enables the shape of the wiper blade 120 to be maintained. In accordance with the invention, even though the rail springs are not shown in the drawings, they are inserted into the grooves formed along the side surfaces of the wiper blade 120 so as to provide a predetermined shape to the wiper blade 120. The method for inserting the rail springs into the side surfaces of the wiper blade 120 is well known in the art, and therefore, a detailed explanation thereof will not be provided for the sake of brevity. However, according to one alternative aspect of the present invention, the guide beam and the auxiliary beams of predetermined elasticity are replaced with the aforementioned rail springs. This allows adaptability of the wiper to substantial curvature variations of the windshield, and further provides the same effect as when the rail springs are mounted on the wiper blade, without having the rail springs thereon. It is to be understood, however, that wiper blade assemblies having rail springs are within the scope and in keeping with the spirit of the present invention.

According to a first embodiment of the present invention, there is provided a wiper blade assembly including a flexible elongated wiper blade 120 adapted to come into elastic contact with a windshield of a vehicle, a guide beam 100 adapted to apply the load and motion applied from the wiper arm to the wiper blade 120, being bent to have an initial curvature, a plurality of connection members 40 spaced longitudinally along the guide beam 100, and a plurality of auxiliary beams 50 that are rotatably coupled to the connection members 40 and that serve to hold the wiper blade 120.

Figure 3:
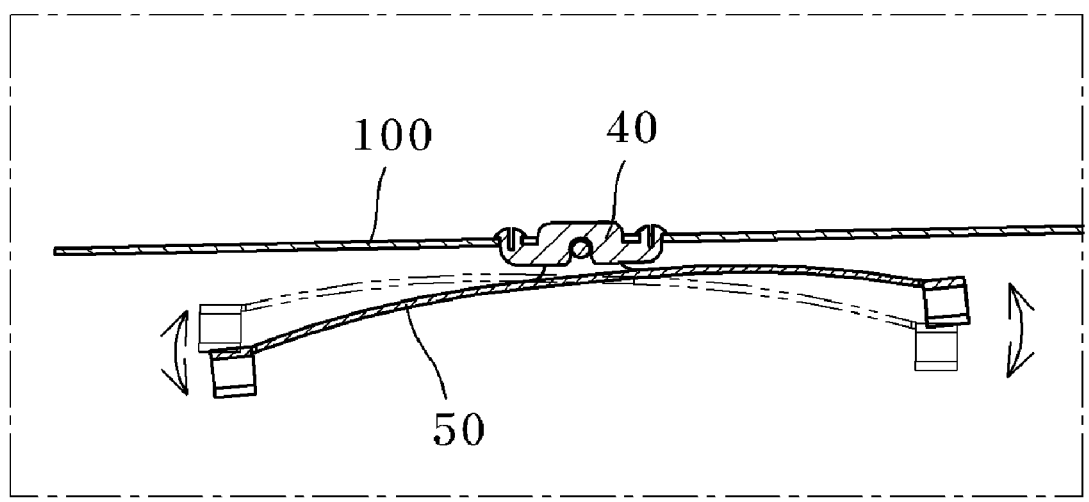
FIG. 3 is a partial front view showing the coupling state among the auxiliary beam, the connection member, and the guide beam in the wiper blade assembly according to the first embodiment of the present invention.
Figure 4:
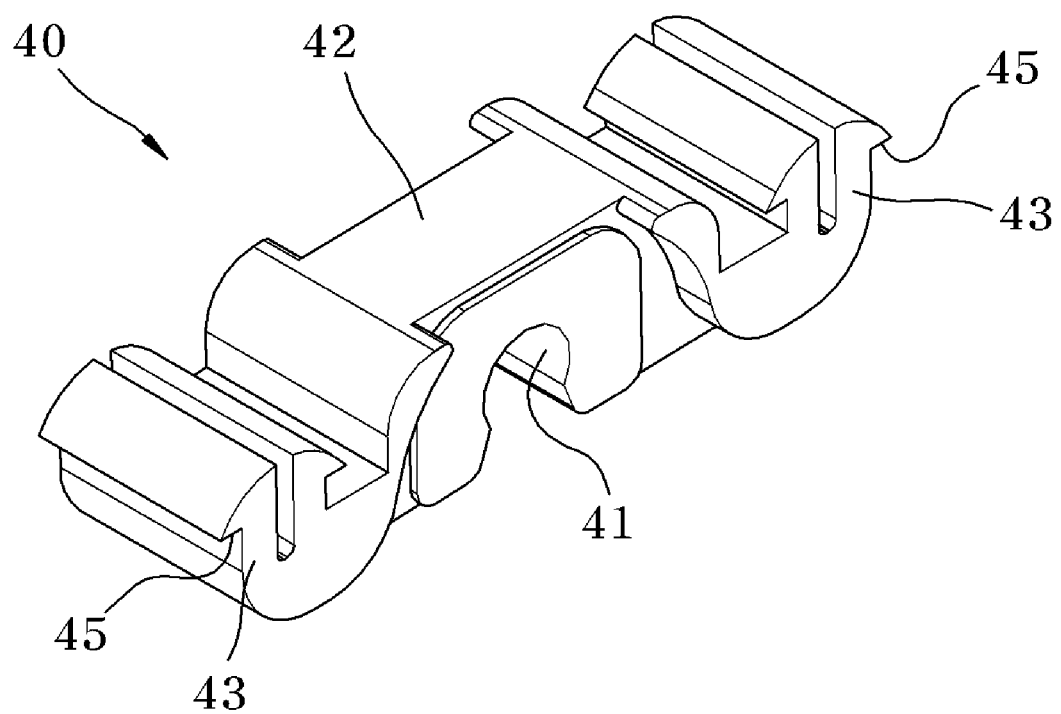
FIG. 4 is a perspective view showing the connection member in the wiper blade assembly according to the first embodiment of the present invention.

FIG. 2 shows the coupling process of the parts of the wiper blade assembly according to the first embodiment of the present invention, and FIG. 3 shows the state after coupling of the parts of the wiper blade assembly. FIG. 4 shows the connection member 40 for mutually connecting the guide beam 100 and the auxiliary beam 50 in the wiper blade assembly according to the present invention.

The guide beam 100 is preferably formed of a flat spring, which is elastically deformable. Even if the guide beam 100 is not elastically deformed, the effects of the present invention are still obtained.

The auxiliary beams 50 are coupled to the connection members 40 and are spaced longitudinally along the guide beam 100, between the guide beam 100 and the wiper blade 120. In the first embodiment of the present invention, as shown in FIG. 1, four auxiliary beams 50 are provided, but the number of auxiliary beams 50 is not limited thereto.

In accordance with the first embodiment of the present invention, each auxiliary beam 50 is made of a metal material and has a given initial curvature to provide a given elastic force. Therefore, the auxiliary beams 50 are mounted between the guide beam 100 and the wiper blade 120, such that they can transfer the force applied from the guide beam 100 to the wiper blade 120 by way of their own elastic forces.

The auxiliary beam 50 is not necessarily made of a metal material. The auxiliary beam 50 may be made of a plastic material having a given elasticity. That is, if the auxiliary beam 50 has a given elasticity to uniformly distribute the force applied from the guide beam 100 to the wiper blade 120, material choice is not critical.

Further, the auxiliary beams 50 are rotatably coupled to the guide beam 100, rotatable toward the wiper blade 120, such that even though the curvature of the surface of the windshield may vary, the auxiliary beams 50 can rotate as necessary in accordance with varying curvature of the windshield, thereby enhancing the effectiveness of the subject wiper blade assemblies on surfaces of varying curvature.

Moreover, if the auxiliary beam 50 is not provided with an initial curvature, the subject wiper assemblies are still effective. That is, the auxiliary beam 50 can be formed with a stepped shape such that it has a given elastic force. More particularly, the auxiliary beam 50 is stepped near both end portions thereof and is extends linearly through the middle portion thereof. In this case, the auxiliary beam 50 is rotatable, thus not departing from the scope or spirit of the present invention.

The auxiliary beam 50 has holding parts 52 formed at both end portions thereof. The holding parts 52 are adapted to fixedly engage the wiper blade 120, or alternatively the rail springs and the wiper blade 120 together. The holding parts 52 extend downwardly from each end portion of the auxiliary beam 50 and bend inwardly like a clamp opposite to one another. The bent holding parts 52 engage the receiving grooves 122 of the wiper blade 120.

The holding parts 52 engage the receiving grooves 122 and are coupled to the wiper blade 120 in such a manner as to extend the full length of the wiper blade 120. According to the first embodiment of the present invention, the guide beam 100 is not mechanically coupled to the wiper blade 120 by way of the direct contact with the wiper blade 120. Instead, the guide beam 100 is coupled to the wiper blade 120 by way of the auxiliary beams 50 and the connection members 40.

An explanation of the process of coupling the auxiliary beams 50 to the guide beam 100 by way of the connection members 40 follows.

Each auxiliary beam 50 is provided with frames, each having a round first coupling hole 56 formed in the center portion thereof. Each connection member 40 has a body 42 having a round second coupling hole 41 formed at positions that correspond to the first coupling holes 56 of the auxiliary beam 50.

A coupling member 60, such as a rivet, is inserted into a respective first coupling hole 56 of the auxiliary beam 50, and a second coupling hole 41 of a connection member 40, thereby rotatably coupling the auxiliary beam 50 to the connection member 40.

The second coupling holes 41 are formed so as to open downwardly, as shown in FIG. 4, but alternatively may be formed completely closed, without any open portion thereof.

As shown in FIG. 3, the auxiliary beams 50 are rotatable with respect to the connection member 40 by way of the coupling member 60, which may be an element such as a rivet. Preferably, rotation of the auxiliary beams 50 is enabled in the direction of the wiper blade 120.

The rotation of the auxiliary beams 50 enables the contacting force with a windshield surface having varying curvatures to be greatly improved.

Next, the process of coupling each connection member 40 to the guide beam 100 will be described.

The guide beam 100 has first coupling apertures 103 formed therein, that are spaced apart from one another. Each connection member 40 has coupling parts 43 formed on the both ends of the body 42 thereof, to facilitate coupling with the guide beam 100. The coupling parts 43 of the connection member 40 are fixedly inserted into the first coupling apertures 103 of the guide beam.

The coupling parts 43 are preferably formed on the both ends of the body 42 of the connection member 40. Alternatively, the coupling part 43 may be formed only on one side surface of the body 42. Even in such an embodiment, the connection member 40 is effectively fixed to the guide beam 100.

Each coupling part 43 has two elastic plates located in parallel to one another. The elastic plates preferably have a locking projection 45 extending outwardly in opposite directions to one another.

The upper surfaces of the coupling part 43 are preferably inclined to facilitate insertion into the first coupling apertures 103 of the guide beam 100. As the inclined surfaces of each coupling part 43 are inserted into the first coupling apertures 103, the two plates of each coupling part 43 are urged inwardly by the forces applied thereto, until the coupling parts 43 engage the first coupling apertures 103. After the coupling parts 43 have been completely inserted into the first coupling apertures 103, the two plates return to their original configuration and the projections 45 serve to prevent the two plates of each of the coupling parts 43 from disengaging the first coupling apertures 103 of the guide beam 100.

The guide beam 100 further includes a plurality of second coupling apertures 104 each adapted to fixedly receive the body 42 of the connection member 50 therein.

With reference to FIGS. 5-8, according to a second embodiment of the present invention, there is provided a wiper blade assembly for wiping a windshield of a vehicle, actuated by a wiper arm, the wiper blade assembly including a flexible elongated wiper blade 120 adapted to come into elastic contact with the windshield of the vehicle, a guide beam 300 adapted to apply the load and motion applied by the wiper arm to the wiper blade, which is bent to have a given initial curvature. The guide beam 300 has a plurality of apertures 304 formed therein, spaced apart from one another along a longitudinal direction thereof. A plurality of connection members 240 are arranged over the guide beam 300, along the longitudinal direction thereof, in such a manner as to be inserted into apertures 304 of the guide beam 300. A plurality of auxiliary beams 250 are arranged under the guide beam 300 and rotatably coupled to the connection members 240. Each of the plurality of auxiliary beams 250 serves to hold the wiper blade 120.

In the second embodiment of the present invention, the coupling manner between the connection members 240 and the auxiliary beams 250 is modified from that in the first embodiment of the present invention. Other parts, including the elongated wiper blade 120, are essentially the same as those in the above-described first embodiment, and therefore will not be described in detail herein.

In this embodiment, each of the auxiliary beams 250 includes a frame 251 formed along the edges of the center portion thereof. The frames 251 are connected to one another by way of a cylindrical member 260.

The cylindrical member 260, as shown in FIGS. 5 to 8, which is connected between the both portions of the frames 251, is not, itself, unique.

The body 242 of the connection member 240 includes a coupling groove 241 formed at a position corresponding to the cylindrical member 260 of the auxiliary beam 250.

Engagement of the cylindrical member 260 and the coupling groove 241, results in mutual rotatable engagement of the auxiliary beam 250 and the connection member 240.

The functions and effects obtained in the second embodiment of the present invention are essentially the same as those of the first embodiment of the present invention.

The connection member 240 further includes stopping parts 245 formed on the ends of the body 242, in such a manner as to come into contact with the guide beam 300, thereby predictably limiting the movement of the connection member 240.

Figure 5:
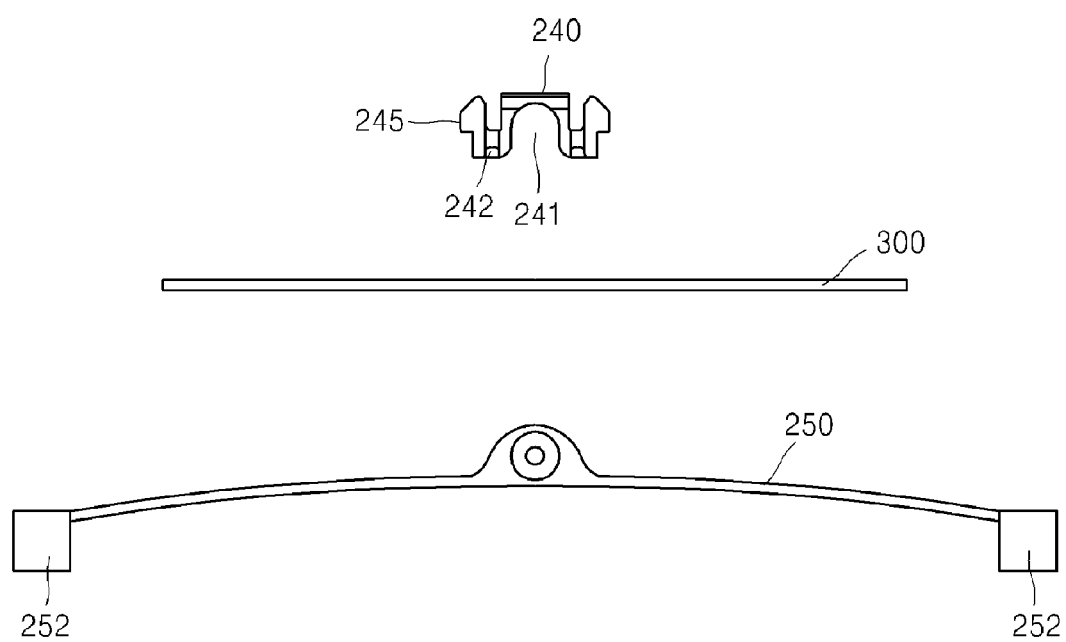
FIG. 5 is a partial front view showing the auxiliary beam, the connection member, and the guide beam prior to assembly of the wiper blade assembly according to a second embodiment of the present invention.
Figure 6:
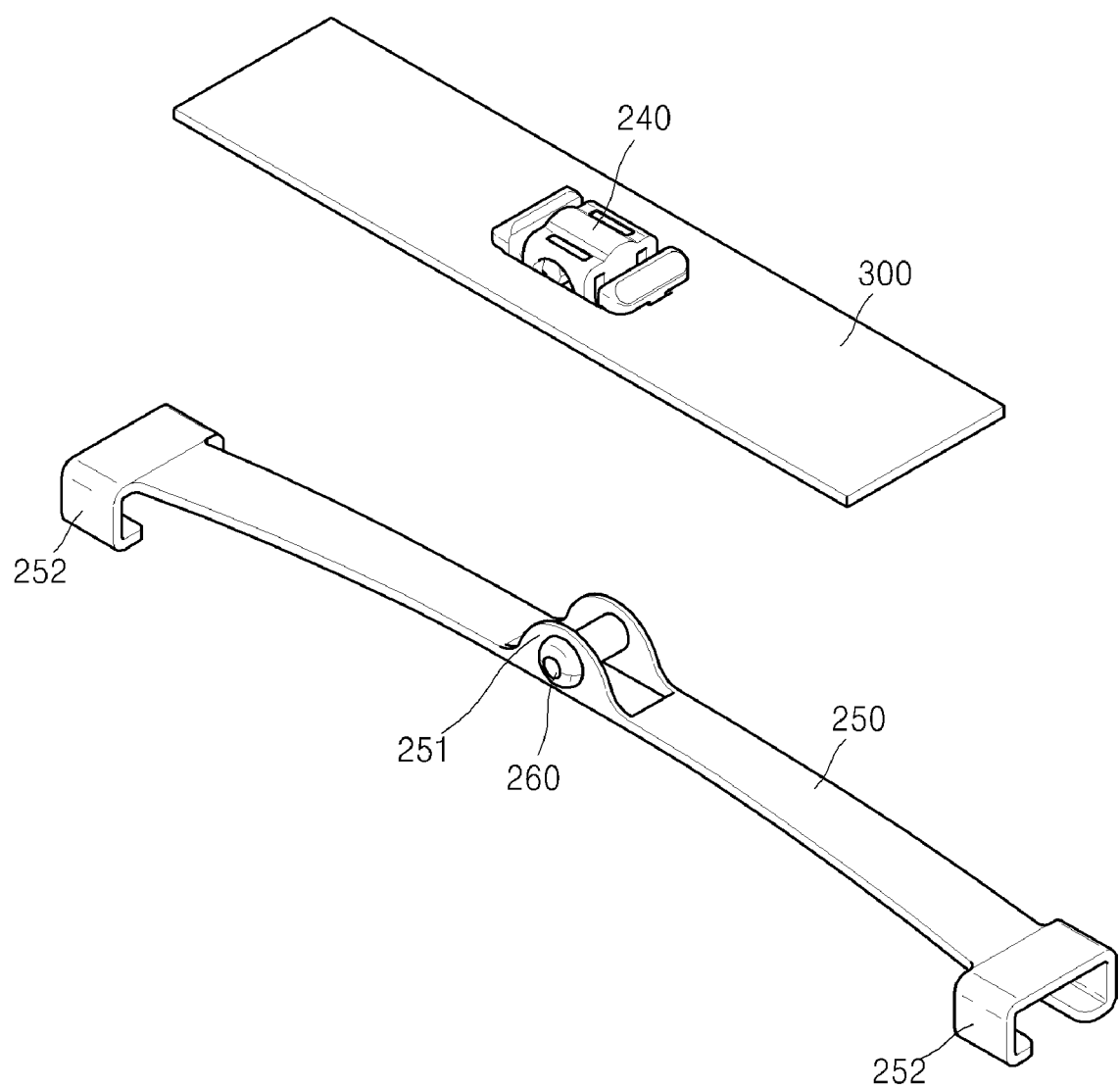
FIG. 6 is a perspective view showing a first step in a coupling process of the wiper blade assembly according to the second embodiment of the present invention.
Figure 7:
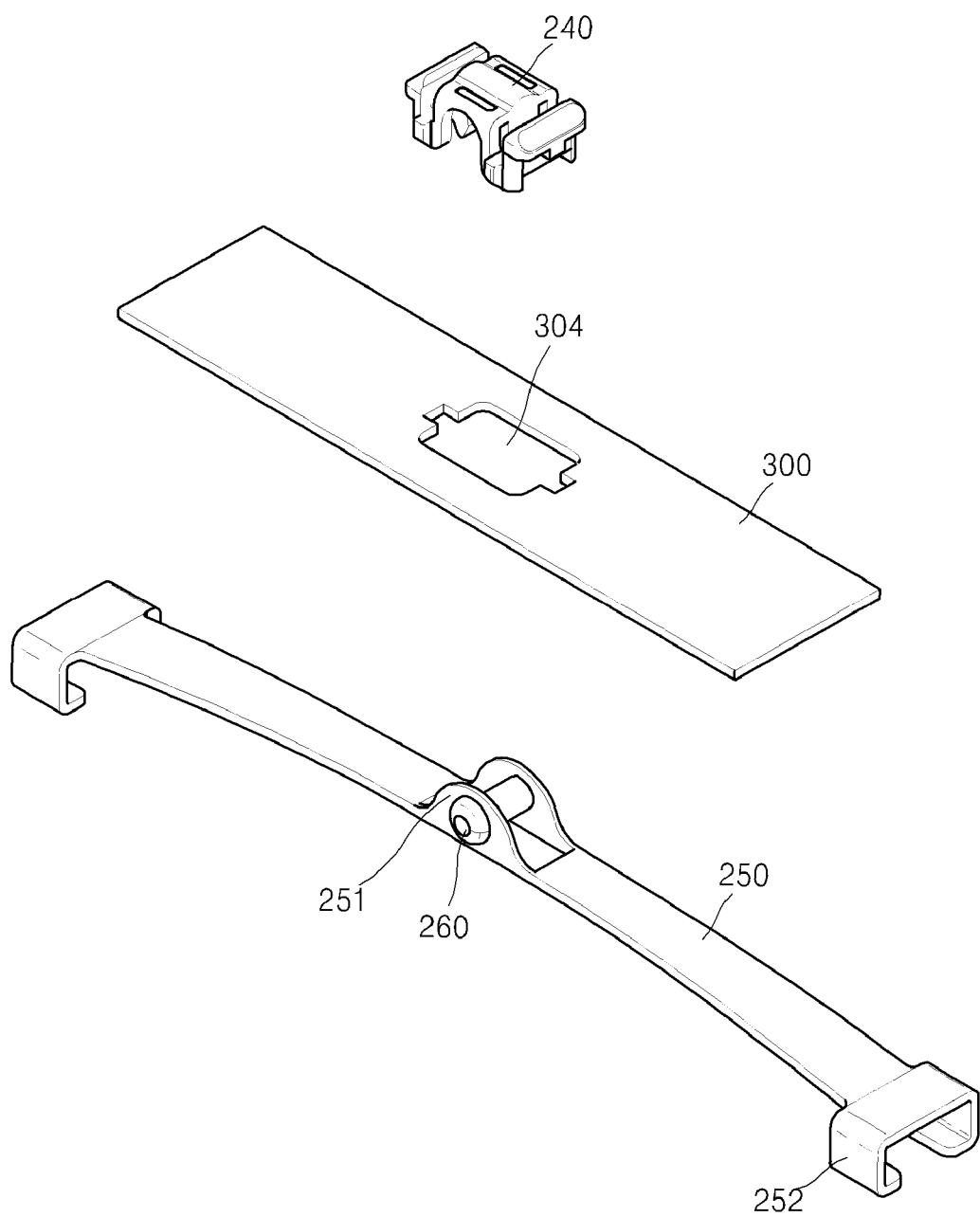
FIG. 7 is a perspective view showing components of the wiper blade assembly according to the second embodiment of the present invention.
Figure 8:
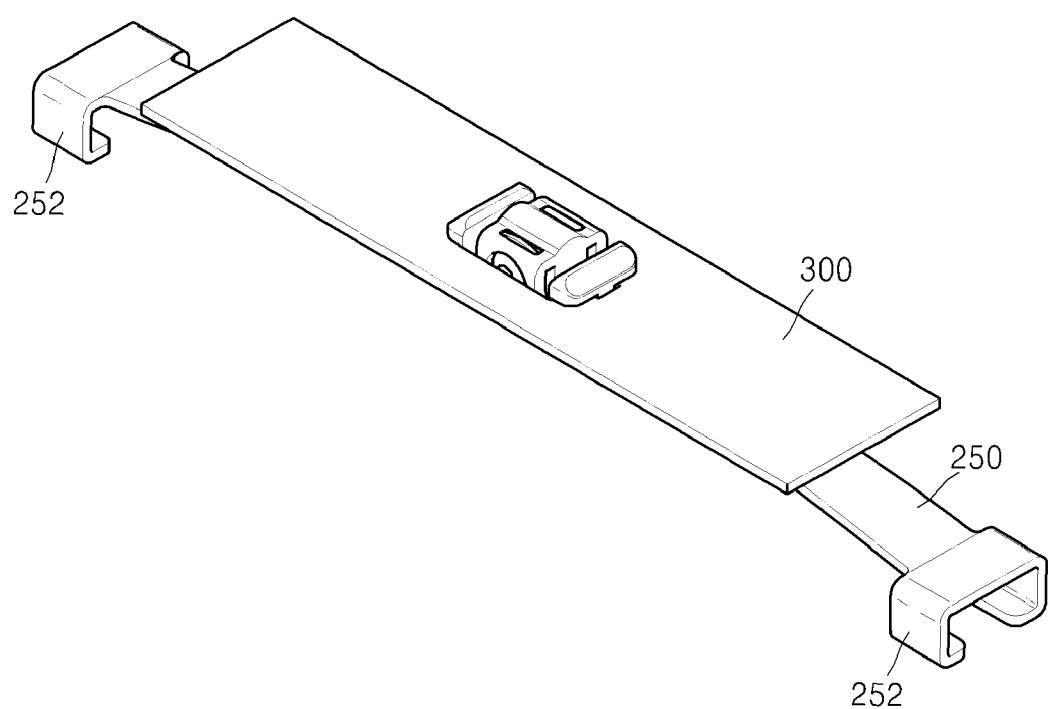
FIG. 8 is a perspective view showing the final step in a coupling process of the wiper blade assembly according to the second embodiment of the present invention.

FIG. 5 is a partial front view showing an uncoupled the coupling state of the auxiliary beam, the connection member, and the guide beam in the wiper blade assembly according to the second embodiment of the present invention. FIGS. 6 through 8 are perspective views illustrating a coupling processes in the wiper blade assembly according to the second embodiment of the present invention.

As set forth above, according to the preferred embodiments of the present invention, there is provided the wiper blade assembly having the following advantages:

First, the plurality of auxiliary beams each having a given elasticity elastic force and a given initial curvature are equally spaced along a longitudinal direction of the guide beam, such that they serve to uniformly distribute the load applied from the wiper arm to the entire portion of the wiper blade when the load is applied from the wiper arm to the guide beam. When the auxiliary beams are spaced equally on the guide beam, they have relatively high stiffness, but still serve to enhance a relatively low degree of compliance to curvature variations of the guide beam.

Furthermore, existing flat wiper blade assemblies are configured to couple one or two guide springs to rubber. According to the present invention, however, the elastic auxiliary beams are advantageously rotatably coupled to the wiper blade structure by way of the connection members, such that the wiper blade assemblies according to the present invention improve compliance to variations in curvature of windshield surfaces and provide relatively uniform distribution of pressure, thereby exhibiting excellent wiping and noise-reducing properties.

When compared with the existing wiper blade assemblies, wiper blade assemblies according to the present invention can provide effective close contact with the surfaces of vehicle windshields, excellent compliance to curvature variations, and uniform wiping of such windshields.

While the present invention has been described with reference to particular illustrative embodiments, it is to be understood that the invention should not be limited thereby It is to be appreciated that those skilled in the art can change or modify the embodiments without departing from the scope or spirit of the present invention.

What is claimed is:

1. A wiper blade assembly for wiping a windshield of a vehicle actuated by a wiper arm, the wiper blade assembly comprising:
    a flexible elongated wiper blade adapted to elastically contact the windshield of the vehicle;
    a guide beam adapted to apply a load and move the wiper blade assembly in connection with the wiper arm, the guide beam being configured with an initial curvature, wherein the guide beam is formed of a flat spring which is elastically deformable;
    a plurality of connection members unrotatably provided along a longitudinal length of the guide beam; and
    a plurality of auxiliary beams rotatably coupled to the connection members, serving to hold the wiper blade, wherein each auxiliary beam is provided with an initial curvature and is made of a material that is elastically deformable,
    wherein each auxiliary beam has one or more frames, each having a round first coupling hole formed in a center portion thereof, and wherein each connection member has a body having a round second coupling hole formed at positions corresponding to respective first coupling holes of the auxiliary beam, such that as the first coupling hole and the second coupling hole are fixedly connected by insertion of a coupling member, the auxiliary beam is rotatably coupled to the connection member.

2. The wiper blade assembly according to claim 1, wherein each connection member has coupling parts formed on opposite ends of the body thereof, for coupling to the guide beam, and wherein the guide beam has first coupling apertures formed therein, spaced apart from one another and configured to fixedly accept insertion of the coupling parts of each connection member.

3. The wiper blade assembly according to claim 2, wherein each coupling part includes a pair of opposed elastic plates located substantially in parallel to one another, the elastic plates having a locking projection extending outwardly in opposite directions from one another.

4. The wiper blade assembly according to claim 1, wherein each auxiliary beam has holding parts formed at both end portions thereof, the holding parts being adapted to fixedly engage the wiper blade.

* * * * *